US011293902B2

(12) United States Patent
Kuwahara

(10) Patent No.: US 11,293,902 B2
(45) Date of Patent: Apr. 5, 2022

(54) INSPECTION APPARATUS, INSPECTION SYSTEM, INSPECTION METHOD, AND STORAGE MEDIUM

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventor: Hiroaki Kuwahara, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 131 days.

(21) Appl. No.: 16/752,911

(22) Filed: Jan. 27, 2020

(65) Prior Publication Data
US 2020/0309739 A1   Oct. 1, 2020

(30) Foreign Application Priority Data

Mar. 25, 2019   (JP) .............................. JP2019-057002

(51) Int. Cl.
*G01M 13/028* (2019.01)
*G01M 7/08* (2006.01)
*G01N 29/04* (2006.01)

(52) U.S. Cl.
CPC ............ *G01N 29/045* (2013.01); *G01M 7/08* (2013.01); *G01M 13/028* (2013.01); *G01N 2291/2693* (2013.01)

(58) Field of Classification Search
CPC ....... G01N 29/04; G01M 13/028; G01M 7/08

USPC .......................................................... 73/579
See application file for complete search history.

(56) References Cited

U.S. PATENT DOCUMENTS

| 5,696,324 A * | 12/1997 | Tsuboi ................... G01N 29/12 |
| | | 73/579 |
| 6,495,812 B1 * | 12/2002 | Wurm ....................... G02B 7/28 |
| | | 204/461 |
| 7,520,189 B2 | 4/2009 | Abbasi et al. |
| 8,370,086 B2 | 2/2013 | Reed |
| 9,255,908 B2 | 2/2016 | Tsutsui et al. |
| 9,261,444 B1 * | 2/2016 | Sutherland ......... G01N 29/2475 |
| 2004/0153268 A1 * | 8/2004 | Volkel .................... G01H 1/003 |
| | | 702/75 |
| 2011/0301874 A1 * | 12/2011 | Reed ........................ G01B 7/14 |
| | | 702/41 |
| 2013/0214811 A1 | 8/2013 | Pinto et al. |

(Continued)

FOREIGN PATENT DOCUMENTS

| CA | 3 050 067 A1 | 7/2018 | |
| CN | 104931128 A * | 9/2015 | ............... G01H 1/00 |

(Continued)

*Primary Examiner* — Jacques M Saint Surin
(74) *Attorney, Agent, or Firm* — Oblon, McClelland, Maier & Neustadt, L.L.P.

(57) ABSTRACT

According to one embodiment, an inspection apparatus determines an object to be in a first state when an intensity at a first frequency of a frequency characteristic is not less than a first threshold, and determines the object to be in a second state when the intensity at the first frequency is less than the first threshold. The frequency characteristic is generated based on a vibration of the object when the object is struck. The second state is different from the first state.

19 Claims, 12 Drawing Sheets

(56) References Cited

U.S. PATENT DOCUMENTS

2019/0033263 A1* 1/2019 Giurgiutiu ............. G01N 29/46
2019/0368968 A1* 12/2019 Morimoto ............... G01M 7/08

FOREIGN PATENT DOCUMENTS

| JP | 2000074889 | * | 4/2000 | ............. G01N 29/12 |
| JP | 2000-131196 A | | 5/2000 | |
| JP | 2004219110 A | * | 8/2004 | ............. G01N 29/14 |
| JP | 3646551 | * | 5/2005 | ............. G01N 29/12 |
| JP | 2013-142598 A | | 7/2013 | |
| JP | 5602952 B2 | | 10/2014 | |
| JP | 6333492 B1 | * | 5/2018 | .......... G01M 13/028 |
| WO | WO 2018/134992 A1 | | 7/2018 | |

* cited by examiner

INSPECTION APPARATUS, INSPECTION SYSTEM, INSPECTION METHOD, AND STORAGE MEDIUM

CROSS-REFERENCE TO RELATED APPLICATIONS

This application is based upon and claims the benefit of priority from Japanese Patent Application No. 2019-057002, filed on Mar. 25, 2019; the entire contents of which are incorporated herein by reference.

FIELD

Embodiments described herein relate generally to an inspection apparatus, an inspection system, an inspection method, and a storage medium.

BACKGROUND

There is an inspection apparatus that inspects an object. It is desirable to increase the inspection accuracy of the inspection apparatus.

DETAILED DESCRIPTION

Figure 1:
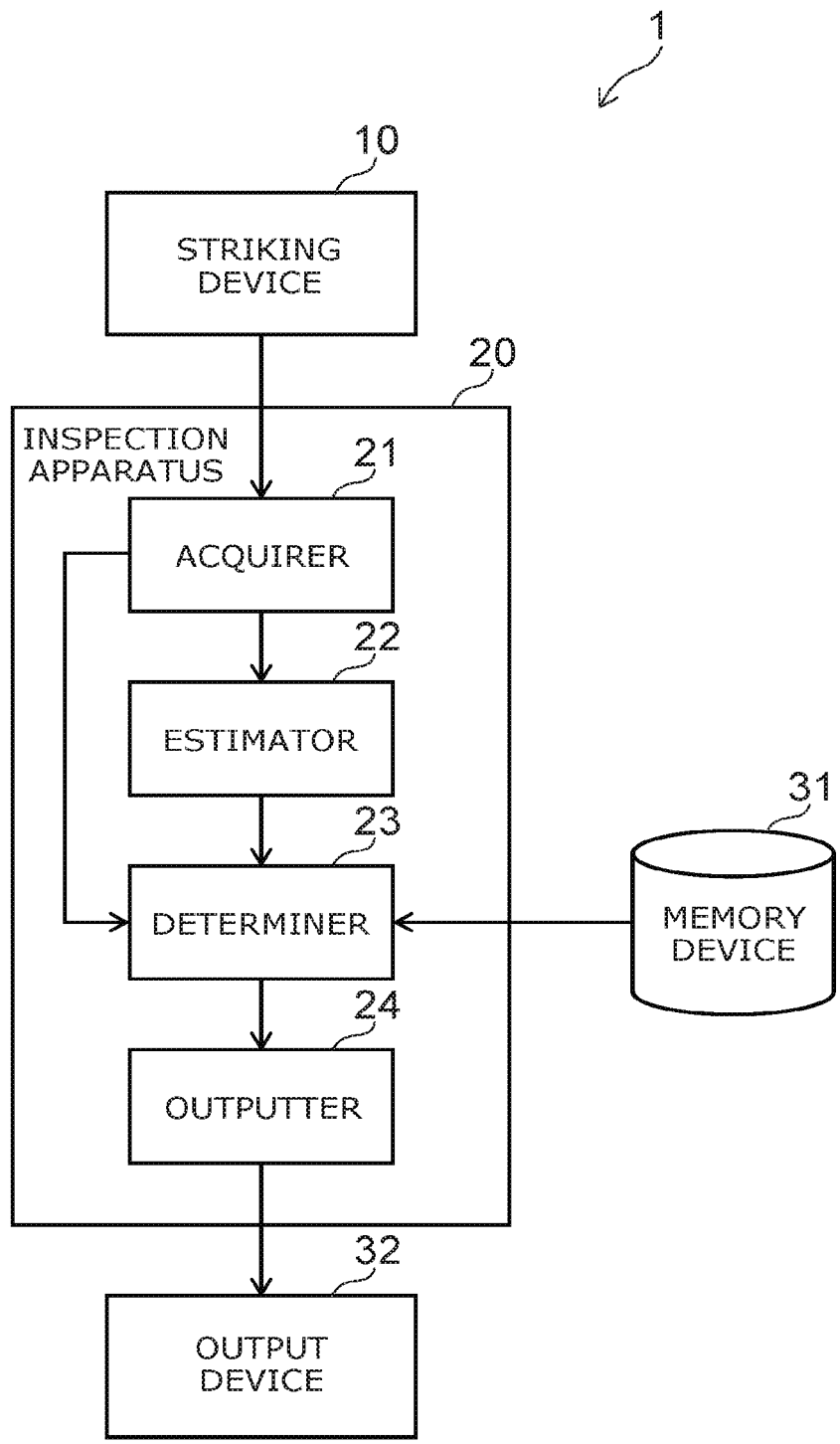
FIG. 1 is a schematic view illustrating the configuration of an inspection system according to an embodiment.

According to one embodiment, an inspection apparatus determines an object to be in a first state when an intensity at a first frequency of a frequency characteristic is not less than a first threshold, and determines the object to be in a second state when the intensity at the first frequency is less than the first threshold. The frequency characteristic is generated based on a vibration of the object when the object is struck. The second state is different from the first state.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view illustrating the configuration of an inspection system according to an embodiment.

The inspection system 1 according to the embodiment includes a striking device 10 and an inspection apparatus 20. In the example illustrated in FIG. 1, the inspection system 1 further includes a memory device 31 and an output device 32.

The striking device 10 according to the embodiment strikes an object to be inspected. The striking device 10 detects or calculates a vibration generated in the object when struck. The vibration is generated by the reaction force when the object is struck. In other words, the striking device 10 detects or calculates the reaction force generated in the object. Based on the reaction force acquired by the detection or the calculation, the striking device 10 calculates a frequency characteristic of the object.

The striking device 10 transmits the frequency characteristic to the inspection apparatus 20. Based on the frequency characteristic obtained from the result of striking the object, the inspection apparatus 20 according to the embodiment inspects whether or not there is loosening in the object. For example, the object includes multiple rigid bodies. When there is no loosening in the object, the distance between the rigid bodies is zero or relatively short. When there is loosening in the object, the distance between the rigid bodies is relatively long.

For example, the inspection system 1 inspects whether or not there is loosening in the fastening of a member fastened by a bolt. The frequency characteristic when there is loosening in the fastening is different from the frequency characteristic when there is no loosening in the fastening. The inspection system 1 also can inspect for an abnormality in a welded product in which two or more members are welded. The striking device 10 strikes the weld portion and obtains multiple frequencies. The frequency characteristic when multiple members are formed as an integral body is different from the frequency characteristic when the weld is inappropriate or the multiple members are not formed as an integral body. The inspection system 1 also can inspect whether or not there is loosening in a wedge provided in a slot of a generator. The frequency characteristic when the wedge is loosened is different from the frequency characteristic when the wedge is not loosened.

Specifically, as illustrated in FIG. 1, the inspection apparatus 20 includes an acquirer 21, an estimator 22, a determiner 23, and an outputter 24.

The striking device 10 transmits the frequency characteristic of the object to the inspection apparatus 20. The acquirer 21 acquires the information input to the inspection apparatus 20. Or, the striking device 10 may store the information in the memory device 31. The acquirer 21 accesses the memory device 31 and acquires the information. The acquirer 21 transmits the acquired information to the estimator 22 and the determiner 23.

Using the input frequency characteristic, the estimator 22 estimates the value of a variable included in the transfer function and indicating the loosening of the object. The transfer function represents the relationship between the action force applied to the object and the reaction force from the object. When estimating, the estimator 22 refers to the information stored in the memory device 31.

The memory device 31 stores a transfer function including multiple variables. The estimator 22 converts the transfer function into a frequency characteristic (a function of a frequency domain). The estimator 22 performs fitting of the frequency characteristic transmitted from the striking device 10 and the frequency characteristic obtained from the transfer function and estimates the value of the variable indicating the loosening of the object. The memory device 31 also stores a relationship between the value of the variable and the distance between rigid bodies. Using this relationship, the estimator 22 acquires the distance corresponding to the estimated variable value. The estimator 22 transmits the acquired distance to the determiner 23.

The determiner 23 performs a first determination operation and a second determination operation. In the first determination operation, the determiner 23 determines the state of the object based on the frequency characteristic. In the second determination operation, the determiner 23 determines the state of the object based on the distance. The determination operations are described below in detail.

In the first determination operation, the determiner 23 determines the object to be in a first state when the intensity at a first frequency of the frequency characteristic is not less than a preset threshold. The determiner 23 determines the object to be in a second state different from the first state when the intensity at the first frequency is less than the threshold.

In the second determination operation, the determiner 23 determines the object to be in the first state when the distance is less than the preset threshold. The determiner 23 determines the object to be in the second state when the distance is not less than the threshold.

For example, the determiner 23 combines the determination result of the first determination operation and the determination result of the second determination operation and outputs the final determination result. The determiner 23 finally determines the object to be in the first state when the first state is determined in both the first determination operation and the second determination operation. The determiner 23 finally determines the object to be in the second state when the second state is determined in the first determination operation or the second determination operation.

The determiner 23 transmits, to the outputter 24, the inspection result including the determined state of the object. The outputter 24 transmits the determination result to the output device 32. For example, the output device 32 displays the inspection result. The output device 32 may emit a sound or light indicating the inspection result. Or, the outputter 24 may transmit the data to an external server by using FTP (File Transfer Protocol), etc., and may insert the data into an external database server by using ODBC (Open Database Connectivity), etc. The outputter 24 may output the inspection result in a prescribed file format such as CSV, etc., and may store the inspection result in the memory device 31 or a recording medium such as an SD card, etc.

The inspection apparatus 20 includes a central processing unit including a processing circuit. The memory device 31 includes, for example, at least one of a hard disk drive (HDD), network-attached storage (NAS), or a solid-state drive (SSD). The output device 32 includes, for example, at least one of a monitor, a projector, a touch panel, a printer, or a speaker (an audio output). The inspection apparatus 20 may be included in the striking device 10 or may be connected to the striking device 10 by a wired or wireless technique or a network. The memory device 31 and the output device 32 may be included in the striking device 10 or the inspection apparatus 20 or may be connected to the striking device 10 and the inspection apparatus 20 by a wired or wireless technique or a network.

Effects of the embodiment will now be described.

As described above, the inspection apparatus 20 according to the embodiment performs the first determination operation and the second determination operation. In the first determination operation, the determiner 23 determines the state of an object by using a frequency characteristic generated based on a vibration of the object when the object is struck. In the second determination operation, the determiner 23 estimates the value of a variable which indicates the state of the object and is included in a function of a relationship between an action force and a reaction force. Then, the determiner 23 acquires the distance between the rigid bodies corresponding to the value of the variable and determines the state of the object by using the distance.

For example, conventionally, a human listens to the sound when the object is struck; and the human determines the state of the object. Or, the human uses the sense of touch to sense the vibration when the object is struck; and the human determines the state of the object. In these methods, the result of the determination is dependent on the sensing of the human.

In another method, the sound when the object is struck is detected; and the state of the object is determined using the frequency characteristic of the sound. However, in this method, an accurate determination result cannot be obtained when the surroundings are noisy and the noise is high.

In the embodiment, to solve these problems, the state of the object is determined using a frequency characteristic obtained by directly detecting or by estimating the vibration (the reaction force) of the object. In other words, in the embodiment, the frequency characteristic that is utilized is obtained by detecting or estimating the vibration traveling through a solid; and a frequency characteristic that is obtained by detecting the vibration of a gas (sound) is not utilized. According to the inspection apparatus 20 according to the embodiment, the state of the object can be determined without being dependent on the sensing by a human and without being affected by the noise of the surroundings. Therefore, the state of the object can be determined more accurately.

The inspection apparatus 20 may output the final determination result by performing only one of the first determination operation or the second determination operation. It is desirable for the inspection apparatus 20 to perform both the first determination operation and the second determination operation and determine the state of the object based on the determination result. According to this method, the state of the object can be determined more accurately.

The embodiment will now be described in detail with reference to specific examples.

Figure 2A:
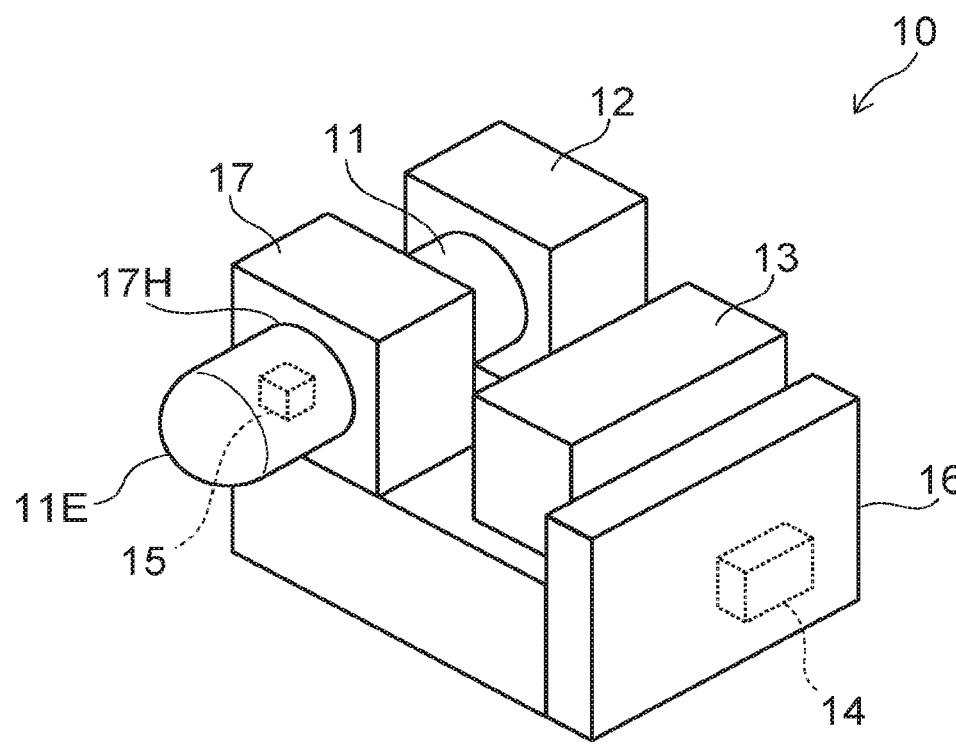
FIGS. 2A and 2B are perspective view illustrating a striking device according to the embodiment.
Figure 2A:
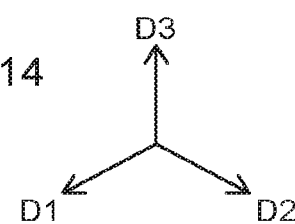
Figure 2B:
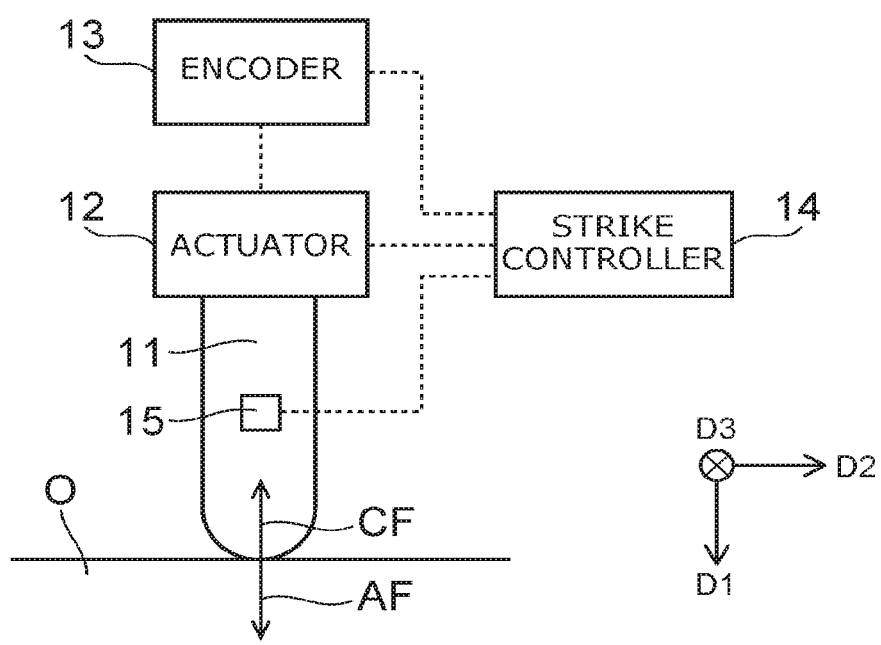

FIG. 2A is a perspective view illustrating a striking device according to the embodiment. FIG. 2B is a schematic view illustrating a portion of the striking device according to the embodiment.

As illustrated in FIG. 2A and FIG. 2B, the striking device 10 includes a striker 11, an actuator 12, an encoder 13, a strike controller 14, a detector 15, a housing 16, and a supporter 17.

The striker 11 applies an action force AF to an object O which is the inspection object by striking the object O. The striker 11 is, for example, a columnar rigid body. For example, a tip 11E of the striker 11 is spherical. The tip 11E may be conic such as a circular cone, polygonal pyramid, etc. It is desirable for the tip 11E to be spherical or conic in order to have a point contact with the inspection object. Due to the point contact, the reaction force described below can be detected or calculated more accurately.

The actuator 12 drives the striker 11. In the example illustrated in FIG. 2A and FIG. 2B, the actuator 12 strikes the object O by moving the striker 11 along a first direction D1. The actuator 12 is, for example, a motor.

The encoder 13 detects the rotation amount of the actuator 12 which is a motor. The strike controller 14 controls the actuator 12 based on the detection result of the encoder 13.

The detector 15 detects the vibration (a reaction force CF) generated in the object O when the striker 11 strikes the object O. For example, the detector 15 is provided inside the striker 11. The detector 15 may be provided separately from the striker 11. The detector 15 is, for example, a force sensor. The configuration and the position of the detector 15 are modifiable as appropriate as long as the reaction force CF from the object O can be detected. The detector 15 transmits the detection result to the strike controller 14.

Or, the strike controller 14 may estimate the reaction force based on the detection result of the encoder 13. In such a case, the striking device 10 may not include the detector 15. Therefore, the striking device 10 can be downsized. For example, when the striker 11 strikes the object O, the striker 11 vibrates due to the reaction force CF from the object O. When the striker 11 vibrates, the encoder 13 detects the displacement amount or the displacement speed of the striker 11. Based on the detected displacement amount or displacement speed, the strike controller 14 calculates the reaction force of the object O.

When striking the object O, the reaction force CF cannot be detected or estimated accurately if the striker 11 contacts or is too proximal to the object O. Therefore, after detecting or estimating the reaction force CF, it is desirable for the strike controller 14 to operate the actuator 12 so that the striker 11 is separated not less than a reference distance from the object O. The reaction force CF can be detected or estimated more accurately thereby.

The striker 11, the actuator 12, the encoder 13, the strike controller 14, and the detector 15 are mounted to the housing 16. The housing 16 includes, for example, the supporter 17. The supporter 17 has a hole 17H. The striker 11 pierces the hole 17H of the supporter 17. The striker 11 moves inside the hole 17H along the first direction D1. In the hole 17H, the striker 11 overlaps (contacts) the supporter 17 in a second direction D2 and a third direction D3. The second direction D2 is perpendicular to the first direction D1. The third direction D3 is perpendicular to the first direction D1 and the second direction D2. The movement in the second direction D2 and the movement in the third direction D3 of the striker 11 are suppressed thereby.

The strike controller 14 calculates the frequency characteristic of the object O by using the action force AF applied by the striker 11 and the reaction force CF from the object O. For example, a fast Fourier transform is used to calculate the frequency characteristic. The strike controller 14 transmits the calculated frequency characteristic to the inspection apparatus 20. Or, the striking device 10 may transmit the action force AF and the reaction force CF to the inspection apparatus 20; and the inspection apparatus 20 may calculate the frequency characteristic of the object O from the information. The inspection apparatus 20 performs the first determination operation and the second determination operation described above by using the frequency characteristic and outputs the determination result.

The inspection apparatus 20 may be included in the striking device 10. For example, the strike controller 14 may include the function of the inspection apparatus 20.

Figure 3:
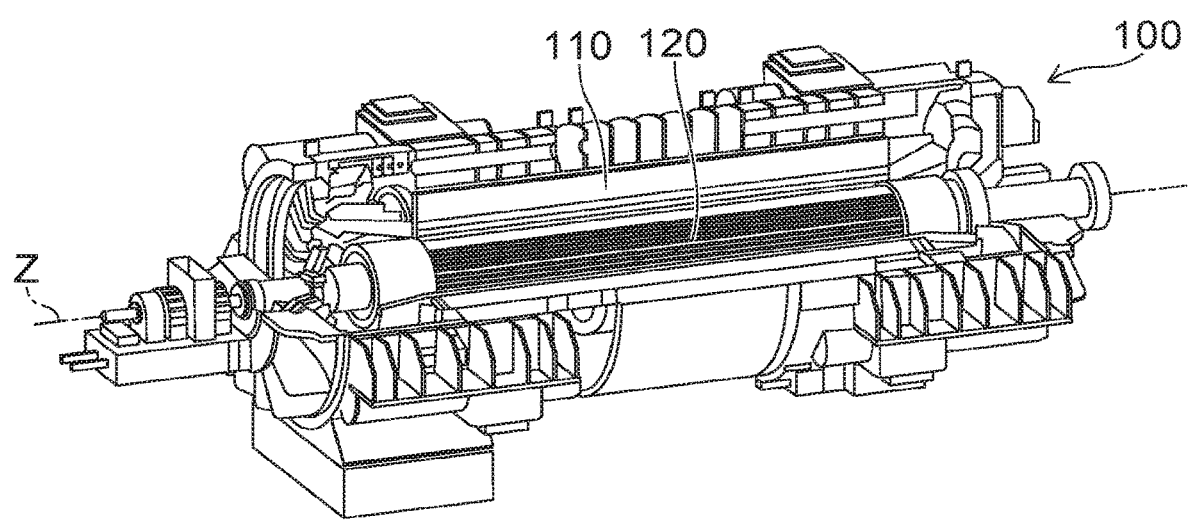
FIG. 3 is a perspective view illustrating a generator.
Figure 4A:
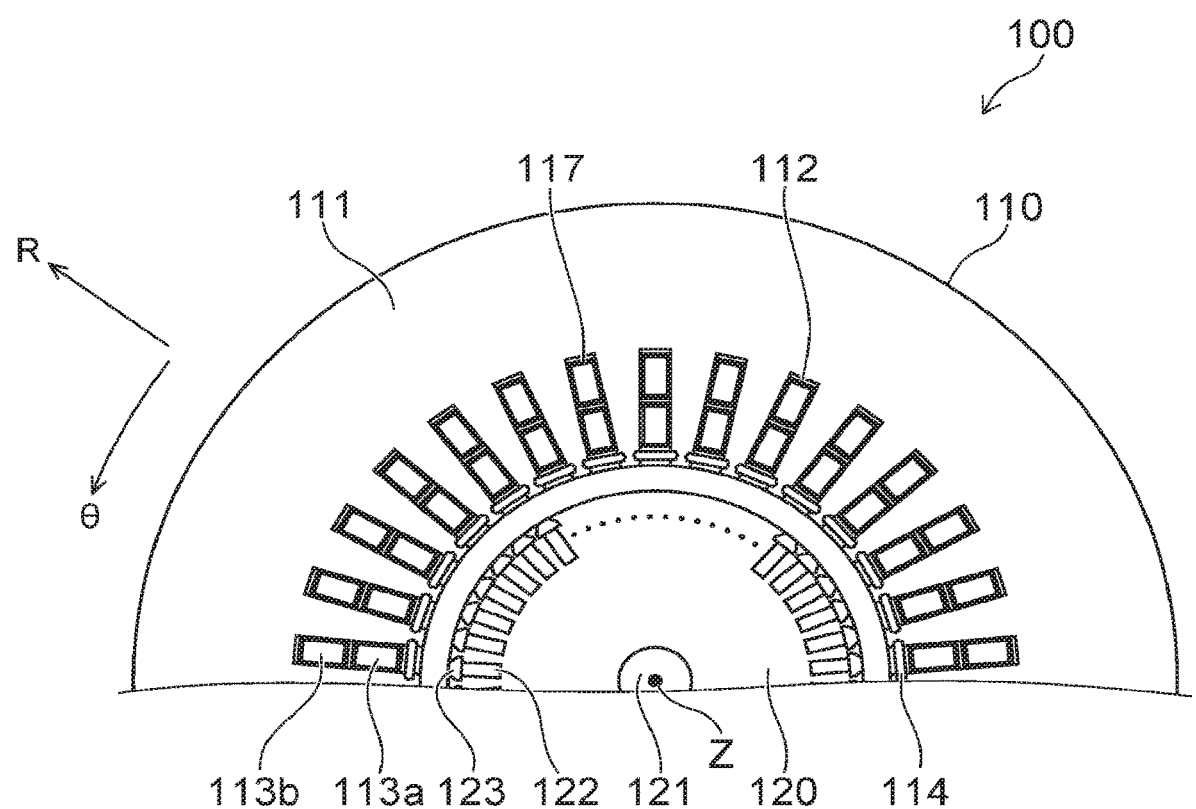
FIGS. 4A and 4B are cross-sectional views illustrating portions of the generator.
Figure 4B:
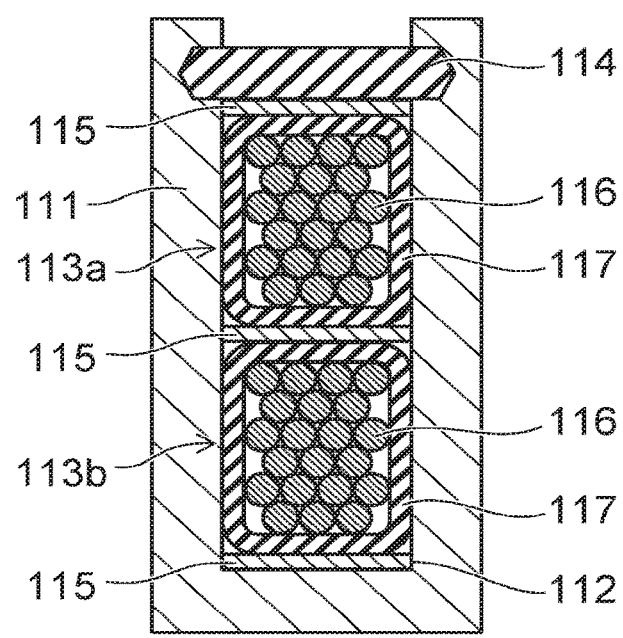

FIG. 3 is a perspective view illustrating a generator. FIGS. 4A and 4B are cross-sectional views illustrating portions of the generator.

A portion of the generator 100 is not illustrated in FIG. 3 to illustrate the internal structure of the generator 100.

As illustrated in FIG. 3, the generator 100 includes a stator 110 and a rotor 120. The rotor 120 rotates along a circumferential direction θ with a rotation axis 121 as the center. The stator 110 is provided around the rotor 120. A gap is provided between the stator 110 and the rotor 120. The stator 110 and the rotor 120 oppose each other in a diametrical direction R perpendicular to the circumferential direction θ and an axis direction Z of the rotation axis 121.

FIG. 4A illustrates the structure of the generator 100 in a cross section perpendicular to the rotation axis 121. FIG. 4B is a cross-sectional view in which a portion of FIG. 4A is enlarged. As illustrated in FIG. 4A, the stator 110 includes an iron core 111 and multiple slots 112. The rotor 120 includes multiple field windings 122 and multiple wedges 123. The multiple slots 112 are arranged along the circumferential direction θ at positions of the iron core 111 facing the rotor 120. The multiple field windings 122 and the multiple wedges 123 are arranged along the circumferential direction θ at positions facing the stator 110.

As illustrated in FIG. 4B, an upper coil 113a, a lower coil 113b, a wedge 114, and multiple spacers 115 are provided in each of the slots 112. The upper coil 113a and the lower coil 113b each include a wire 116, and an insulating body 117 surrounding the wire 116. The multiple spacers 115 are provided respectively between the lower coil 113b and the bottom surface of the slot 112, between the lower coil 113b and the upper coil 113a, and between the upper coil 113a and the wedge 114.

The spacers 115 are elastic bodies and are, for example, plate springs. The wedge 114 presses the upper coil 113a, the lower coil 113b, and the spacers 115 so that gaps do not occur between the upper coil 113a, the lower coil 113b, and the spacers 115.

Figure 5:
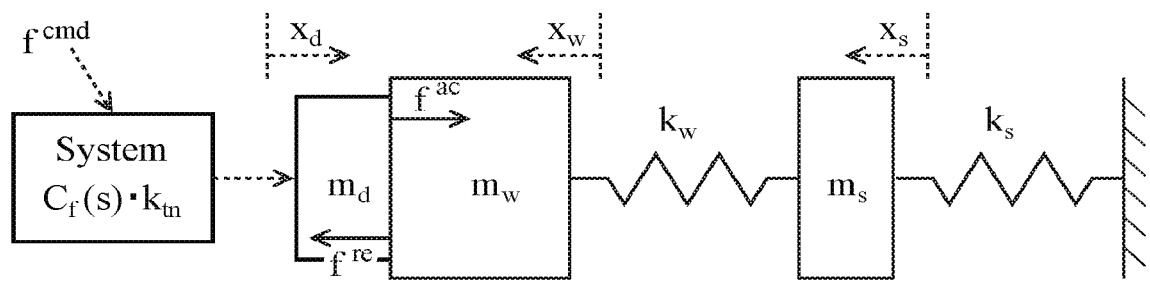
FIG. 5 is a model illustrating an example of the inspection object.

FIG. 5 is a model illustrating an example of the inspection object.

For example, the upper coil 113a, the lower coil 113b, the wedge 114, and the spacers 115 are represented using the model of FIG. 5.

In the model illustrated in FIG. 5, $x_d$ is the position in the diametrical direction R of the striker 11. $x_w$ is the position in the diametrical direction R of the wedge 114. $x_s$ is the position of the rigid body provided between the wedge 114 and the bottom surface of the slot 112. $f^{cmd}$ is an action force set by the user. $f^{ac}$ is the action force output by the striker. $f^{re}$ is the reaction force from the object. $C_f(s)$ is a function for causing $f^{ac}$ to approach $f^{cmd}$. $k_m$ is a torque constant. $C_f(s)$ and $k_m$, are predetermined. $k_w$ is a variable indicating the state of the wedge. $k_s$ is a variable indicating the state of the coil and the spacer. $m_d$ is the weight of the striker. $m_w$ is the weight of the wedge. $m_s$ is the weight of the coil and the spacer. s is the product of the imaginary unit j and an angular velocity ω. ω is $2\pi f$.

Here, the model is generated using the bottom surface of the slot 112 as a fixed end. The upper coil 113a and the lower coil 113b are rigid bodies; the spacers 115 are considered to expand and contract uniformly; and the upper coil 113a, the lower coil 113b, and the multiple spacers 115 are considered to be one object having the weight $m_s$.

The motion equations relating to the position $x_d$, the position $x_w$, and the position $x_s$ of the model illustrated in FIG. 5 are represented in Formulas 1 to 3 recited below.

$$m_s \frac{d^2}{dt^2} x_s + k_s x_s + k_w(x_s - x_w) = 0 \quad \text{[Formula 1]}$$

$$m_w \frac{d^2}{dt^2} x_w + k_w(x_w - x_s) = -f^{ac} \quad \text{[Formula 2]}$$

$$m_d \frac{d^2}{dt^2} x_d = -f^{re} \quad \text{[Formula 3]}$$

Using Formulas 1 to 3, the transfer function representing the relationship between the force $f^{cmd}$ and the force $f^{re}$ is represented by Formula 4 recited below.

$$\frac{f^{re}}{f^{cmd}} = \quad \text{[Formula 4]}$$
$$-\frac{c_f(s)k_m}{1+c_f(s)k_m} \frac{(m_d s^2)(m_s s^2 + k_s + k_w)}{m_w m_s s^4 + (m_w k_s + m_w k_w + m_s k_w)s^2 + k_s k_w}$$

Figure 6:
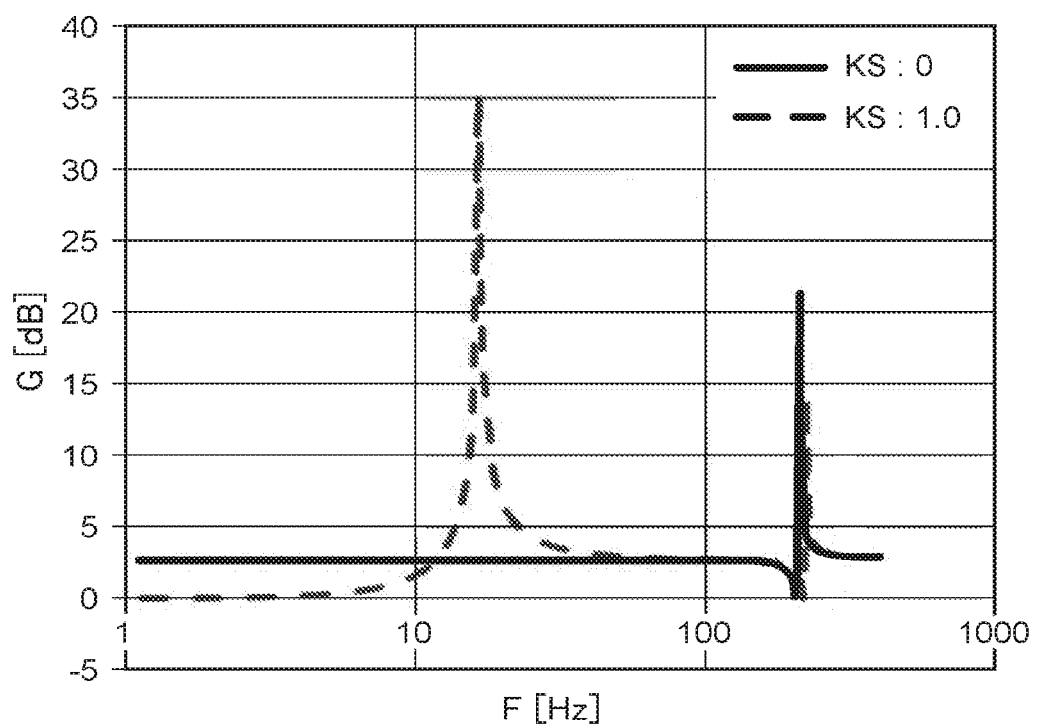
FIG. 6 is a graph illustrating frequency characteristics obtained from a simulation.

FIG. 6 is a graph illustrating frequency characteristics obtained from a simulation.

FIG. 6 illustrates the results of the transfer function of Formula 4 when the frequency f is changed between 1 to 400 Hz. In FIG. 6, the vertical axis is a gain G (dB); and the horizontal axis is a frequency F (Hz). The solid line illustrates the result when $k_s$ is set to zero. The broken line illustrates the result when $k_s$ is set to a designated value.

From the results of FIG. 6, it can be seen that there is a peak between 100 Hz and 1000 Hz regardless of the value of $k_s$. The intensity of the peak is large when the value of $k_s$ is small. A peak also appears between 10 Hz and 100 Hz when the value of $k_s$ is large.

Figure 7:
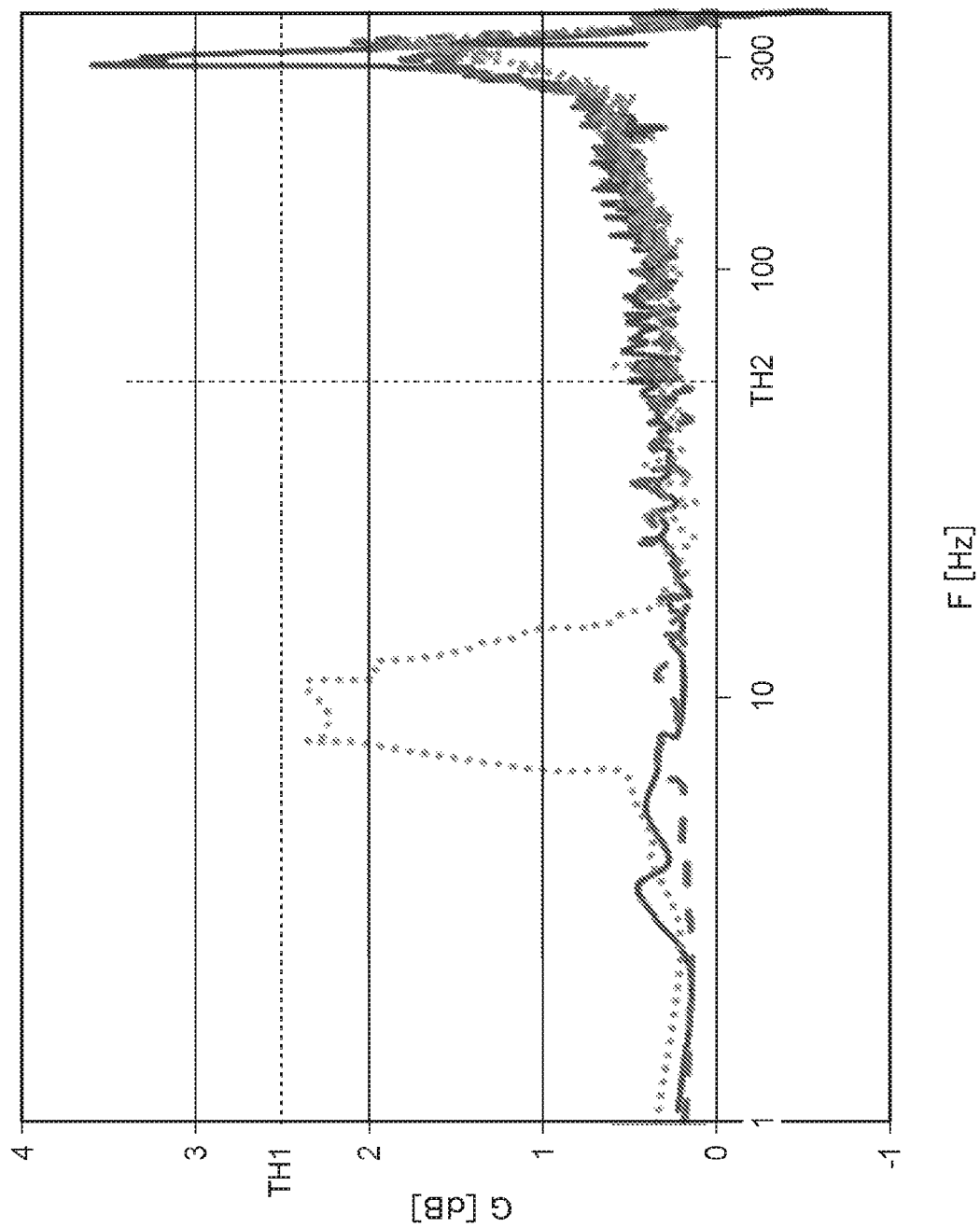
FIG. 7 is a graph illustrating frequency characteristics obtained from an experiment.

FIG. 7 is a graph illustrating frequency characteristics obtained from an experiment.

FIG. 7 illustrates experiment results obtained using a system modeling the structure provided in the slot 112. In FIG. 7, the vertical axis is the gain G (dB); and the horizontal axis is the frequency F (Hz). The solid line illustrates the frequency characteristic when there is no loosening in the wedge 114. The broken line illustrates the frequency characteristic when there is slight loosening in the wedge 114. The dotted line illustrates the frequency characteristic when there is much loosening in the wedge 114.

When the wedge 114 loosens, the distance between the lower coil 113b and the bottom surface of the slot 112, the distance between the lower coil 113b and the upper coil 113a, and the distance between the upper coil 113a and the wedge 114 lengthen. In other words, the compression of the spacers 115 weakens; and the lengths in the diametrical direction R of the spacers 115 lengthen.

For example, the striking device 10 illustrated in FIG. 2A and FIG. 2B strikes the wedge 114. The action force that is applied from the striker 11 to the wedge 114 is transmitted by the upper coil 113a, the lower coil 113b, and the spacers 115; and the reaction force from the upper coil 113a, the lower coil 113b, and the spacers 115 is transmitted to the striker 11. The strike controller 14 calculates the frequency characteristic based on the action force and the detected or estimated reaction force. FIG. 7 shows an example of the frequency characteristics.

In the results of FIG. 7, there is a peak at the 300 Hz vicinity for each case regardless of the loosening. When there is loosening in the wedge 114, the intensity of the peak at the 300 Hz vicinity is small. When there is much loosening of the wedge 114, a peak appears at the 10 Hz vicinity.

For example, the acquirer 21 acquires the frequency characteristic shown in FIG. 7. The determiner 23 utilizes the characteristics described above and performs the first determination operation of determining the state of the object based on the frequency characteristic. For example, as illustrated in FIG. 7, the determiner 23 detects a peak at a frequency that is not less than a preset threshold TH2 (a second threshold). The determiner 23 compares the intensity of the peak to a preset threshold TH1 (a first threshold). When the intensity is larger than the threshold TH1, the determiner 23 determines the state to be the first state in which there is no loosening in the object. When the intensity is smaller than the threshold TH1, the determiner 23 determines the state to be the second state in which there is loosening in the object.

Or, in the first determination operation, the determiner 23 may detect a peak at a frequency not less than the threshold TH2, and a peak at a frequency less than the threshold TH2. The determiner 23 determines the object to be in the first state when the intensity of the peak at the frequency not less than the threshold TH2 is larger than the threshold TH1. The determiner 23 determines the object to be in the second state when there is a peak at a frequency less than the threshold TH2.

The determiner 23 may perform the determination by combining the conditions described above. For example, the determiner 23 determines the object to be in the first state when the intensity of the peak at a frequency not less than the threshold TH2 is not less than the threshold TH1. The determiner 23 determines the object to be in the second state when the intensity of the peak at a frequency not less than the threshold TH2 is less than the threshold TH1 and there is a peak at a frequency less than the threshold TH2.

The estimator 22 calculates the frequency characteristic from the transfer function stored in the memory device 31 and performs fitting with the frequency characteristic transmitted from the acquirer 21. For example, the estimator 22 uses the least-squares method to estimate the values of the variables so that the frequency characteristic transmitted from the acquirer 21 best fits the frequency characteristic based on the transfer function. $m_d$, $m_w$, and $m_s$ may be predetermined. When the estimator 22 has estimated the value of $k_s$, the estimator 22 accesses the memory device 31.

Figure 8:
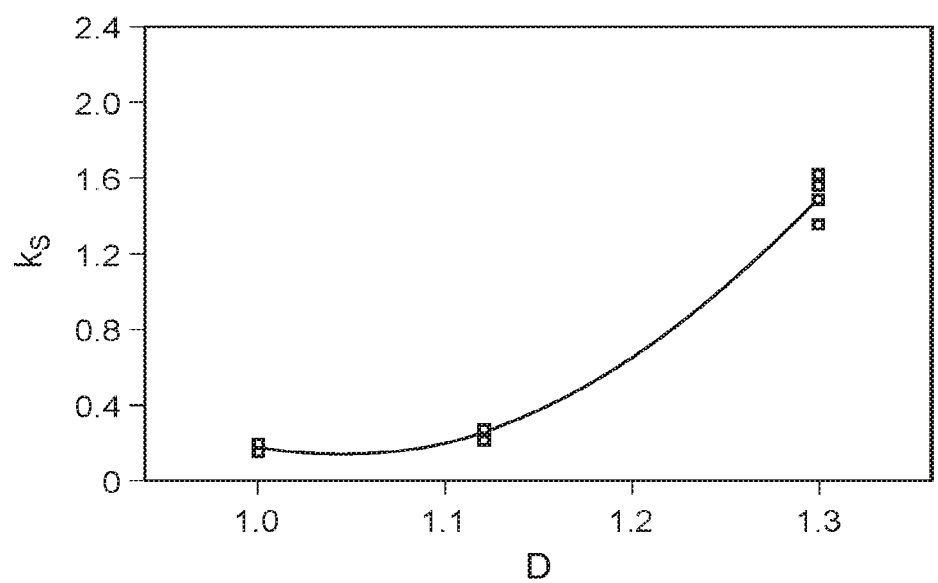
FIG. 8 is a graph illustrating a characteristic of the object.

FIG. 8 is a graph illustrating a characteristic of the object.

Similarly to FIG. 7, FIG. 8 illustrates experiment results obtained using a system modeling the structure provided in the slot 112. In FIG. 8, the vertical axis is $k_s$. The horizontal axis is a distance D. The distance D is the distance between the lower coil 113b and the bottom surface of the slot 112, the distance between the lower coil 113b and the upper coil 113a, or the distance between the upper coil 113a and the wedge 114. Here, these distances are considered to be equal to each other. In other words, the distance D is the length in the diametrical direction of each of the spacers 115.

The results of FIG. 8 show that there is a correlation between the value of $k_s$ and the value of D. The memory device 31 stores the relationship between the value of $k_s$ and the value of D. In the example of FIG. 8, the relationship between the value of $k_s$ and the value of D is illustrated by the curve in the graph. The memory device 31 stores a formula representing the curve. The memory device 31 may store a table in which correspondence between the value of $k_s$ and the value of D is recited. The memory device 31 may store a model for outputting the value of D from the value of $k_s$.

When the estimator 22 has estimated the value of $k_s$, the estimator 22 refers to the relationship stored in the memory device 31. The estimator 22 estimates the value of D by using the estimated value of $k_s$ and the relationship. The estimator 22 outputs the estimated value of D to the determiner 23.

In the second determination operation, the determiner 23 compares the value of D to a preset threshold (a third threshold). When the value of D is less than the third threshold, the determiner 23 determines the state to be the first state in which there is no loosening in the object. When the value of D is not less than the third threshold, the determiner 23 determines the state to be the second state in which there is loosening in the object.

For example, the determiner 23 outputs the final determination result by combining the determination result of the first determination operation and the determination result of the second determination operation. When the first state is determined for both the first determination operation and the second determination operation, the determiner 23 outputs the final determination result of the object being in the first state. When the second state is determined in the first determination operation or the second determination operation, the determiner 23 outputs the final determination result of the object being in the second state. The outputter 24 outputs the determination result outside the inspection apparatus 20.

Figure 9:
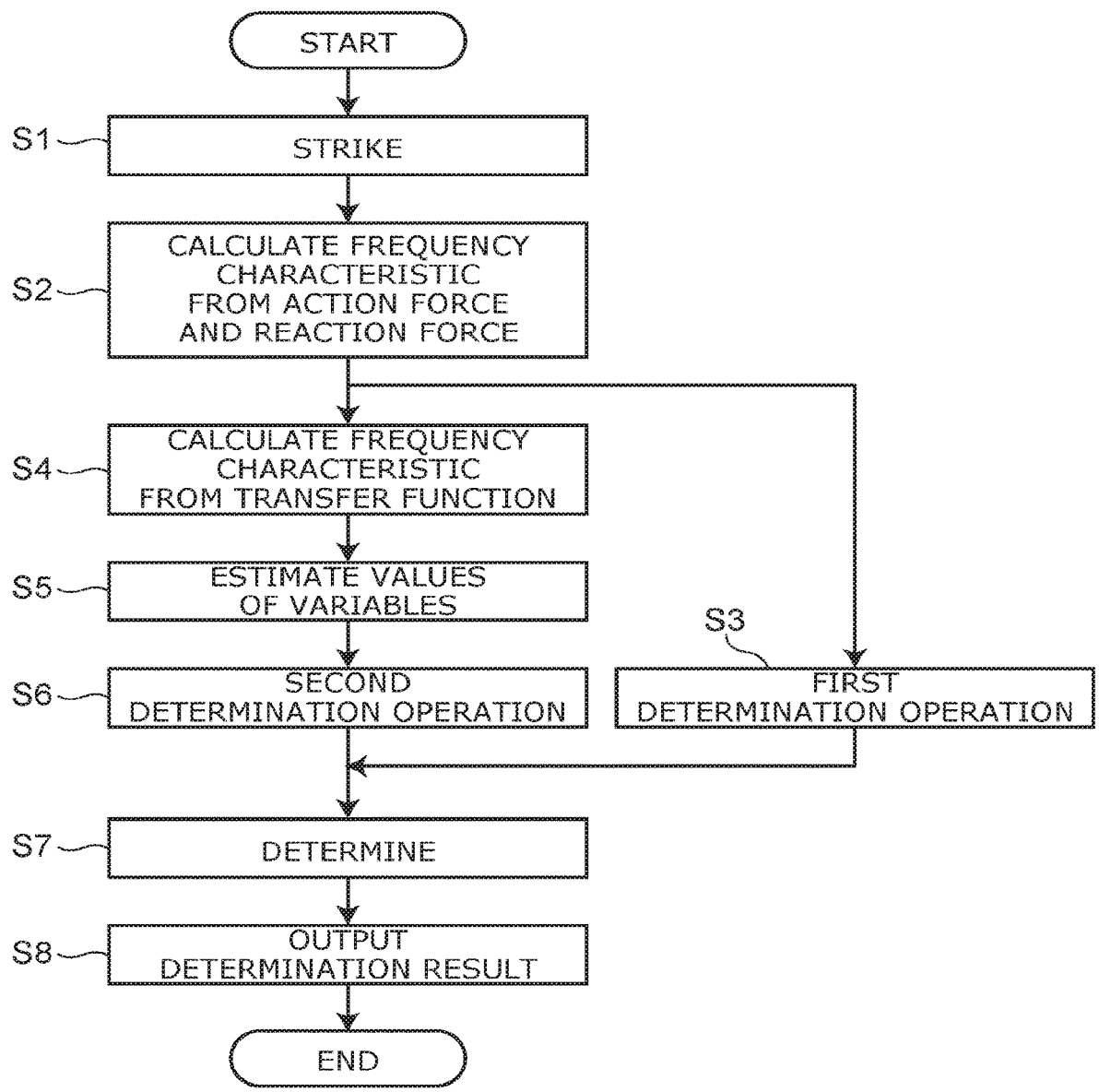
FIG. 9 is a flowchart illustrating operations of the inspection system according to the embodiment.

FIG. 9 is a flowchart illustrating operations of the inspection system according to the embodiment.

First, the striking device 10 strikes the object which is the inspection object (step S1). The frequency characteristic is calculated from the action force and the reaction force at this time (step S2). The striking device 10 transmits the calculation result of the frequency characteristic, the information of the action force and the reaction force, etc., to the inspection apparatus 20. The inspection apparatus 20 performs the first determination operation by using the frequency characteristic (step S3). Also, the inspection apparatus 20 calculates the frequency characteristic from the transfer function stored in the memory device 31 (step S4). The inspection apparatus 20 estimates the values of the variables by using the frequency characteristic obtained in step S2 and the frequency characteristic obtained in step S4 (step S5). The inspection apparatus 20 performs the second determination operation by using the estimated variable values (step S6). The inspection apparatus 20 determines the state of the object based on the results of both the first determination operation and the second determination operation (step S7). The inspection apparatus 20 outputs the determination result to the outside (step S8).

Figure 10:
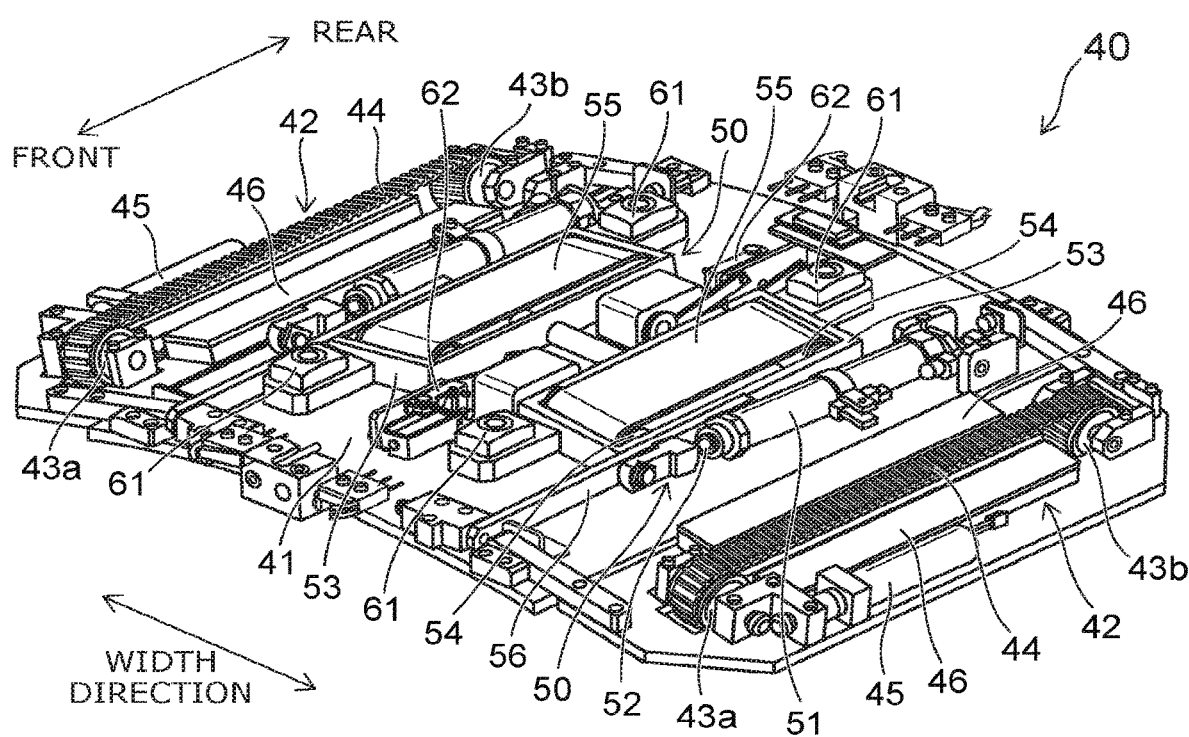
FIG. 10 is a perspective view illustrating a moving body of the inspection system according to the embodiment.

FIG. 10 is a perspective view illustrating a moving body of the inspection system according to the embodiment.

Figure 11:
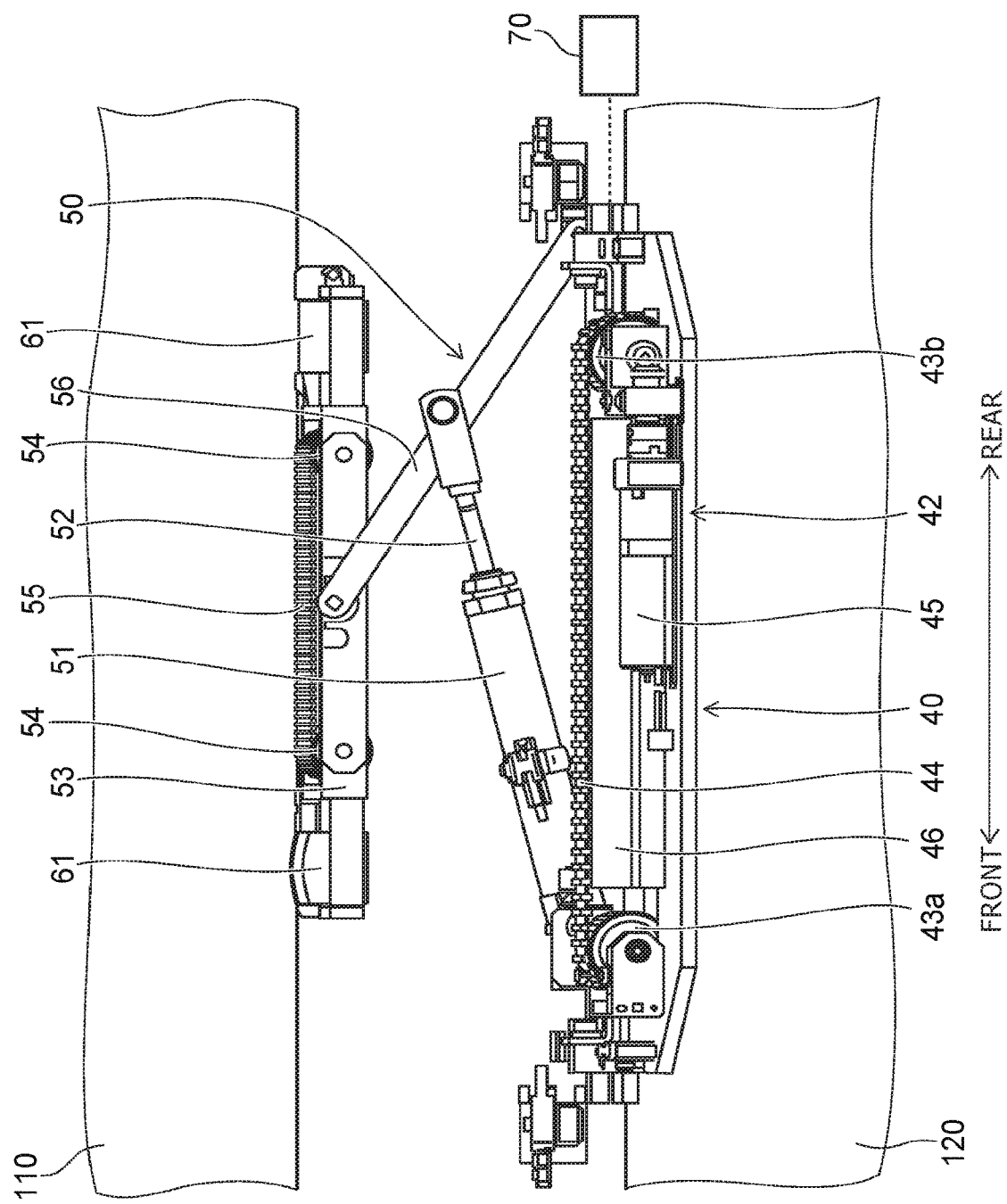
FIG. 11 is a side view illustrating the moving body of the inspection system according to the embodiment.

FIG. 11 is a side view illustrating the moving body of the inspection system according to the embodiment.

The inspection system according to the embodiment may further include the moving body 40 in which the striking device 10 is mounted. For example, the striking device 10 and the inspection apparatus 20 are carried by the moving body 40 illustrated in FIG. 10 and FIG. 11.

As illustrated in FIG. 10, the moving body 40 includes a base plate 41, multiple movement mechanisms 42, a suction mechanism 46, and an inspection unit 50.

The base plate 41 is curved along the surface of the rotor 120.

The multiple movement mechanisms 42 are separated from each other in a width direction perpendicular to a frontward/rearward direction. Each of the movement mechanisms 42 includes a pair of pulleys 43a and 43b, a belt 44, and a motor 45.

The pulleys 43a and 43b are separated from each other in the frontward/rearward direction. The belt 44 is laid over the pulleys 43a and 43b. The belt 44 is exposed on the lower surface side (the rotor 120 side) of the base plate 41. For example, the motor 45 is coupled to the pulley 43a and rotates the pulley 43a. By the rotation of the pulley 43a, the belt 44 is driven; and the moving body 40 is moved. The movement direction of the moving body 40 can be changed by adjusting the rotation amount of the pulley 43a of one of the movement mechanisms 42 and the rotation amount of the pulley 43a of the other of the movement mechanisms 42.

The suction mechanism 46 is disposed at the side of the belt 44. The moving body 40 can be moved while being held to the surface of the rotor 120 by the suction mechanism 46. For example, the suction mechanism 46 performs electrostatic attachment utilizing static electricity or performs vacuum attachment utilizing a pressure difference. The moving body 40 is moved or stopped on the surface of the rotor 120 by adjusting the drive force due to the movement mechanisms 42 and the holding force due to the suction mechanism 46.

The inspection unit 50 is provided on the base plate 41. For example, two inspection units 50 are provided and are separated from each other in the width direction. The inspection unit 50 includes an air cylinder 51, an arm 56, a travel guide described below, a sensor 61, and a sensor 62.

The arm 56 is coupled to a drive rod 52 of the air cylinder 51. As illustrated in FIG. 11, one end portion of the arm 56 is moved vertically using the other end portion as a fulcrum when the drive rod 52 is extended by the driving of the air cylinder 51.

A holder 53 is mounted to the one end portion of the arm 56. The sensors 61 and 62 are held by the holder 53. The travel guide also is held by the holder 53. The travel guide includes a pair of guide rollers 54 and a belt 55. The pair of guide rollers 54 is separated from each other in the frontward/rearward direction. The belt 55 is laid over the guide rollers 54.

A not-illustrated air pipe is connected to the air cylinder 51. A not-illustrated electrical cable is connected to the motor 45. Or, a battery may be mounted to the base plate 41; and the motor 45 may be driven by the battery.

The sensors 61 and 62 are, for example, electric sensors, acoustic sensors, mechanical sensors, etc. For example, the sensor 61 is an EL-CID (electro-magnetic core imperfection detector) sensor. The sensor 62 includes, for example, the striking device 10 and the inspection apparatus 20. For example, the moving body 40 inspects the generator 100 interior (the stator 110 and the rotor 120) by using the sensors 61 and 62 while moving over a surface 2 of the rotor 120.

A moving body controller 70 controls the movement of the moving body 40. For example, the moving body controller 70 moves the moving body 40 so that the sensor 62 is positioned at the slot 112 of the stator 110. When the moving body 40 is moved to the designated position, the moving body controller 70 transmits, to the striking device 10, a signal indicating the completion of the movement. When the strike controller 14 receives this signal, the strike controller 14 strikes the wedge 114 by operating the actuator 12.

FIG. 12A to FIG. 13B are schematic views illustrating application examples of the inspection system according to the embodiment.

Figure 12A:
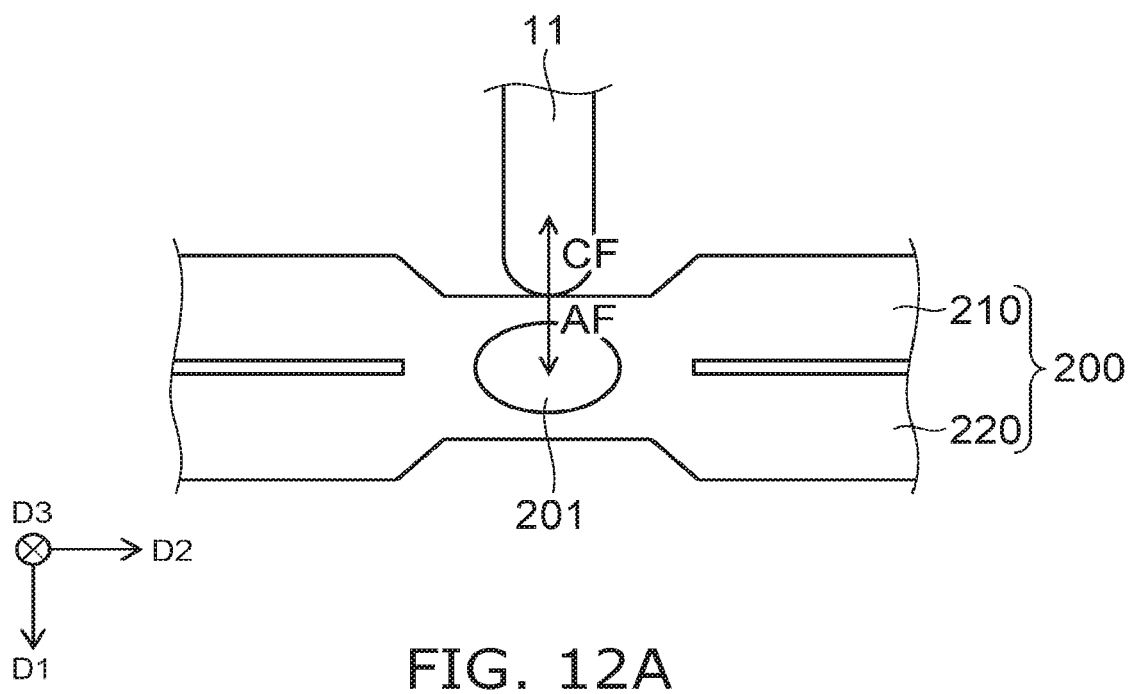
FIGS. 12A and 12B are schematic views illustrating application examples of the inspection system according to the embodiment.
Figure 12B:
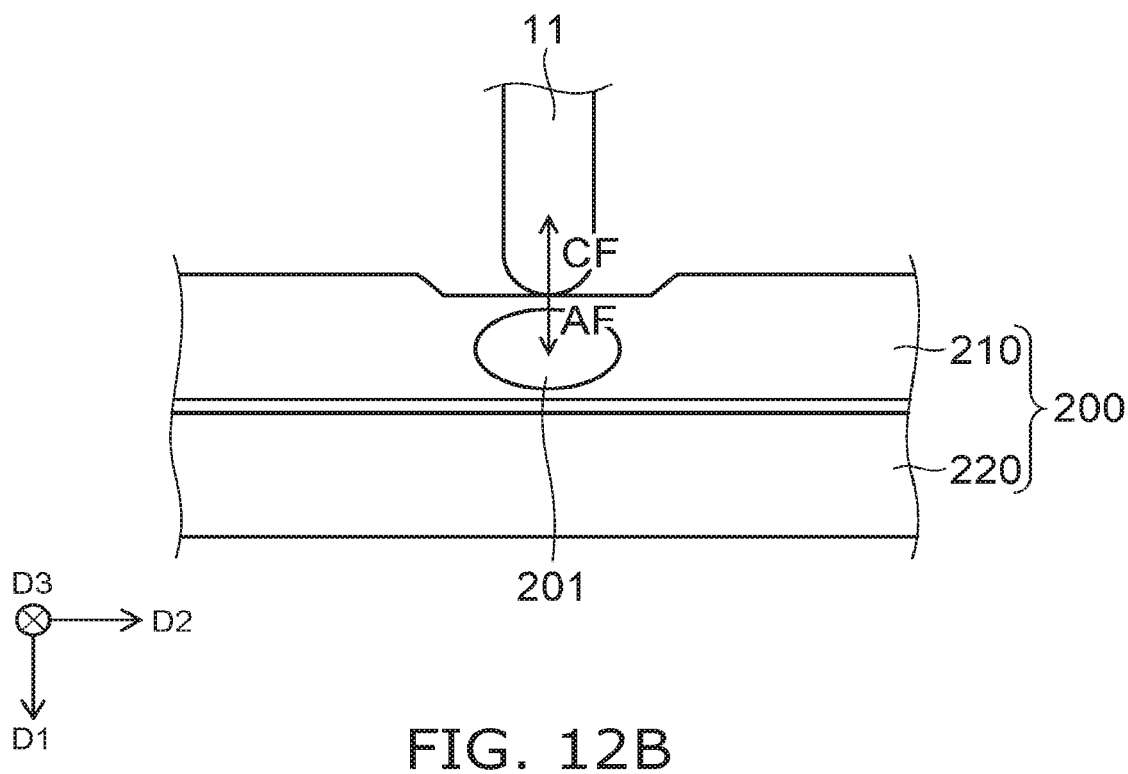

The inspection system 1 according to the embodiment is applicable also to the inspection of a welded product 200 illustrated in FIGS. 12A and 12B. The welded product 200 illustrated in FIGS. 12A and 12B is formed by welding a first member 210 and a second member 220. The first member 210 and the second member 220 are formed as an integral body at a weld portion 201. When welded appropriately as illustrated in FIG. 12A, a boundary between the first member 210 and the second member 220 does not exist at the weld portion 201. In other words, the distance between the first member 210 and the second member 220 is zero.

For example, when not welded appropriately as illustrated in FIG. 12B, the weld portion 201 is formed only at the first member 210; and the first member 210 and the second member 220 are not formed as an integral body. A boundary exists between the first member 210 and the second member 220. In other words, the distance between the first member 210 and the second member 220 is greater than zero.

When the weld portion 201 strikes the striking device 10, similarly to the example of the generator 100, the frequency characteristic of the welded product 200 is obtained from the action force and the reaction force. The distance between the first member 210 and the second member 220 when the welded product 200 is not welded appropriately is longer than the distance between the first member 210 and the second member 220 when the welded product 200 is welded appropriately. Therefore, the frequency characteristic when the welded product 200 is welded appropriately is different from the frequency characteristic when the welded product 200 is not welded appropriately. The inspection apparatus 20 performs the first determination operation and the second determination operation described above by using the frequency characteristic obtained by striking. The inspection apparatus 20 inspects whether or not the welded product 200 is welded appropriately from the results of these determination operations.

Figure 13A:
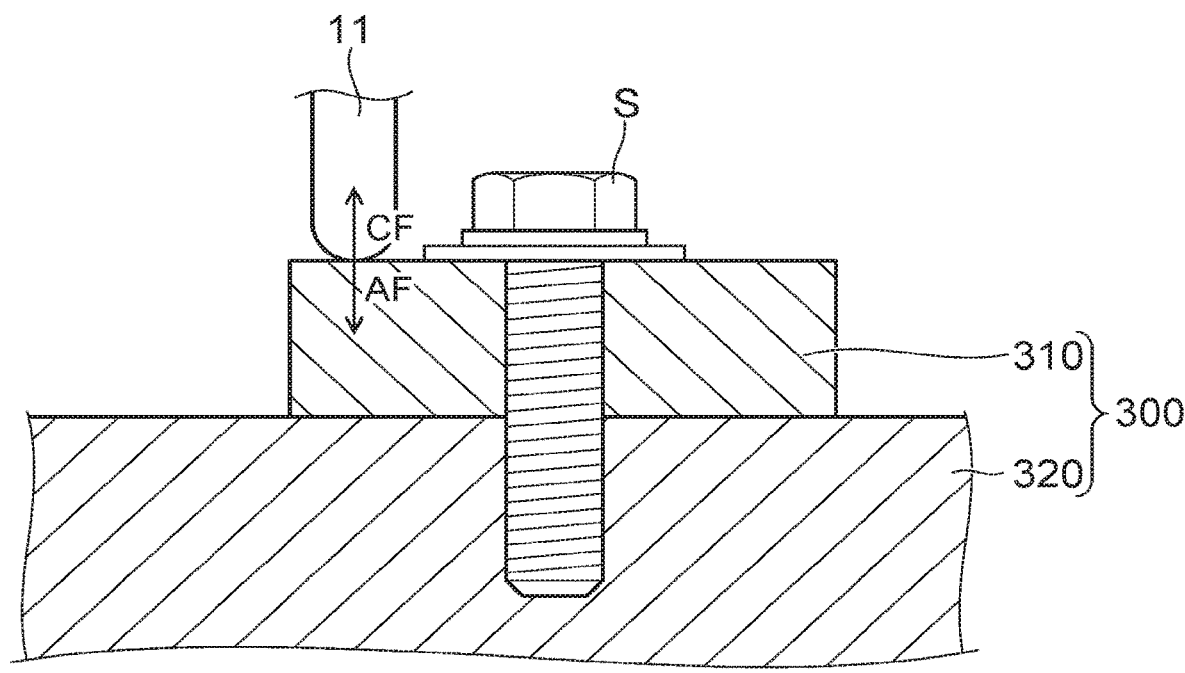
FIGS. 13A and 13B are schematic views illustrating application examples of the inspection system according to the embodiment.
Figure 13B:
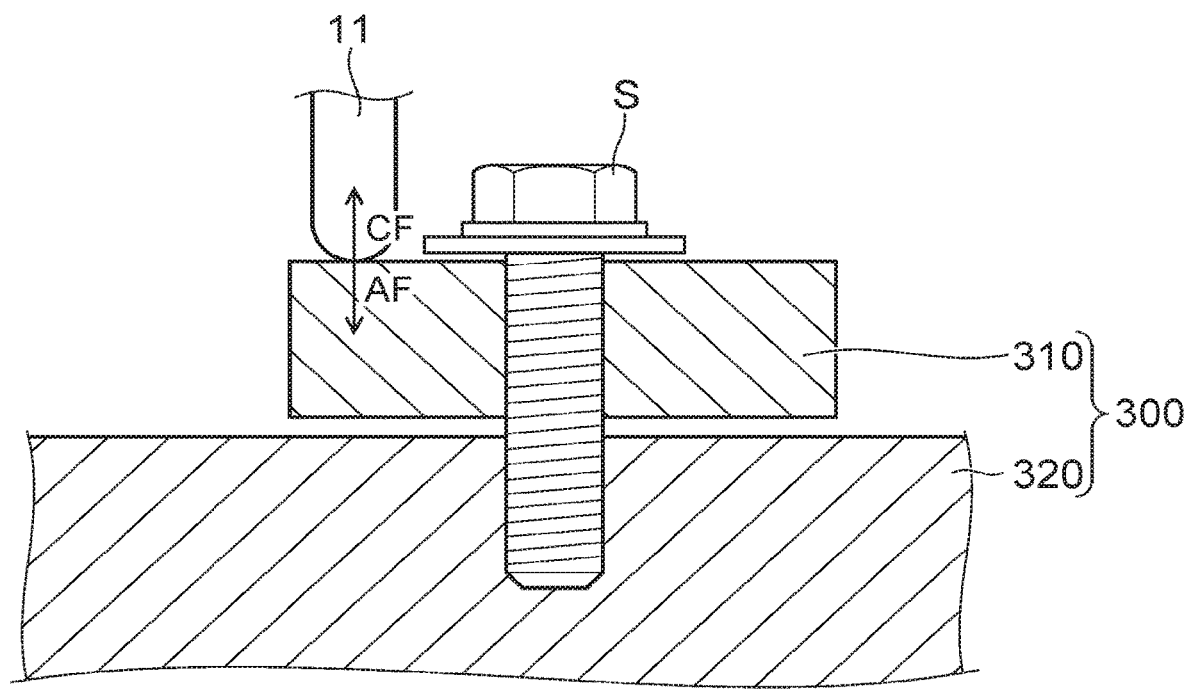

The inspection system 1 according to the embodiment is applicable also to the inspection of a fastening member 300 illustrated in FIGS. 13A and 13B. In the example of FIGS. 13A and 13B, a first member 310 is fastened to a second member 320 by a screw S. The frequency characteristic of the fastening member 300 is obtained from the action force and the reaction force when the striking device 10 strikes the fastening member 300.

When fastened securely by the screw S, the distance between the first member 310 and the second member 320 and the distance between the first member 310 and the head of the screw S are substantially zero. These distances lengthen when the fastening of the screw S loosens. Accordingly, the frequency characteristic when the screw S is fastened securely is different from the frequency characteristic when the fastening is loosened. The inspection apparatus 20 performs the first determination operation and the second determination operation described above by using the frequency characteristic obtained by striking. The inspection apparatus 20 inspects whether or not there is loosening in the fastening by the screw S for the fastening member 300 from the results of these determination operations.

In the embodiment described above, the state of the object is determined using the intensity of a peak, the existence or absence of a peak, etc., of the frequency characteristic in the first determination operation. Instead of this method, the inspection apparatus 20 may determine the state of the object from the feature of a plot of the gain and the frequency of the frequency characteristic. For example, as illustrated in FIG. 6 and FIG. 7, the shape of the frequency characteristic changes according to the state of the object.

Utilizing this feature, the inspection apparatus 20 classifies the acquired frequency characteristic into one of multiple classes. At least one of the multiple classes indicates that there is no loosening in the object. At least one other of the multiple classes indicates that there is loosening of the object. The frequency characteristic may be classified into multiple classes according to the degree of the loosening. For example, a clustering technique such as unsupervised learning or the like is used in the classification.

According to this method, it is unnecessary to set the thresholds TH1 and TH2 such as those illustrated in FIG. 7. The labor necessary for preparation for the inspection can be omitted.

The present invention may include the following embodiments.

Embodiment 1

1. An inspection method, comprising determining an object to be in a first state when an intensity at a first frequency of a frequency characteristic is not less than a first threshold, and determining the object to be in a second state when the intensity at the first frequency is less than the first threshold, the frequency characteristic being generated based on a vibration of the object when the object is struck, the second state being different from the first state.

Embodiment 2

2. An inspection method, comprising determining an object to be in a first state when an intensity at a first frequency of a frequency characteristic is not less than a first threshold, and determining the object to be in a second state when the frequency characteristic has a peak at a second frequency, the frequency characteristic being based on an action force and a reaction force, the action force being applied to the object, the reaction force being from the object when the action force is applied, the first frequency being not less than a second threshold, the second frequency being less than the second threshold, the second state being different from the first state.

Embodiment 3

3. An inspection method, comprising:
estimating, based on an action force and a reaction force, a value of a variable included in a function of a relationship between the action force and the reaction force, the action force being applied to an object including a plurality of rigid bodies, the reaction force being from the object when the action force is applied, the variable indicating a state of the object,
determining the object to be in a first state when a distance between the rigid bodies estimated using the value is less than a third threshold, and determining the object to be in a second state when the distance is not less than the third threshold, the second state being different from the first state.

Embodiment 4

4. An inspection method, comprising:
performing a first determination of comparing, to a first threshold, an intensity at a first frequency of a frequency characteristic generated based on a vibration of an object when a strike is applied to the object;
performing a second determination of estimating, based on an action force and a reaction force, a value of a variable included in a function of a relationship between the action force and the reaction force, and comparing, to a third threshold, a distance between a plurality of rigid bodies estimated using the value, the action force being applied to an object including the plurality of rigid bodies, the reaction force being from the object when the action force is applied, the variable indicating a state of the object; and
determining the object to be in a first state when the intensity of the first determination is not less than the first threshold and the distance of the second determination is less than the third threshold, and determining the object to be in a second state when the intensity of the first determination is less than the first threshold or the distance of the second determination is not less than the third threshold, the second state being different from the first state.

Embodiment 5

5. A storage medium storing a program causing a processing device to determine an object to be in a first state when an intensity at a first frequency of a frequency characteristic is not less than a first threshold, and to determine the object to be in a second state when the intensity at the first frequency is less than the first threshold, the frequency characteristic being generated based on a vibration of the object when the object is struck, the second state being different from the first state.

Embodiment 6

6. A storage medium storing a program causing a processing device to determine an object to be in a first state when an intensity at a first frequency of a frequency characteristic is not less than a first threshold, and to determine the object to be in a second state when the frequency characteristic has a peak at a second frequency, the frequency characteristic being based on an action force and a reaction force, the action force being applied to the object, the reaction force being from the object when the action force is applied, the first frequency being not less than a second threshold, the second frequency being less than the second threshold, the second state being different from the first state.

Embodiment 7

7. A storage medium storing a program causing a processing device to
estimate, based on an action force and a reaction force, a value of a variable included in a function of a relationship between the action force and the reaction force, the action force being applied to an object including a plurality of rigid bodies, the reaction force being from the object when the action force is applied, the variable indicating a state of the object, and
determine the object to be in a first state when a distance between the rigid bodies estimated using the value is less than a third threshold, and determine the object to be in a second state when the distance is not less than the third threshold, the second state being different from the first state.

Embodiment 8

8. A storage medium storing a program causing a processing device to
perform a first determination operation of comparing, to a first threshold, an intensity at a first frequency of a frequency characteristic generated based on a vibration of an object when a strike is applied to the object,
perform a second determination operation of estimating, based on an action force and a reaction force, a value of a variable included in a function of a relationship between the action force and the reaction force, and comparing, to a third threshold, a distance between a plurality of rigid bodies estimated using the value, the action force being applied to an object including the plurality of rigid bodies, the reaction force being from the object when the action force is applied, the variable indicating a state of the object, and
determine the object to be in a first state when the intensity in the first determination operation is not less than the first threshold and the distance in the second determination operation is less than the third threshold, and determine the object to be in a second state when the intensity in the first determination operation is less than the first threshold or the distance in the second determination operation is not less than the third threshold, the second state being different from the first state.

According to the inspection apparatus, the inspection system, or the inspection method according to the embodiments described above, the state of the object can be inspected with higher accuracy.

For example, the processing of the various data recited above is executed based on a program (software). For example, a computer stores the program and performs the processing of the various information recited above by reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The computer may acquire (or read) the program via a network.

At least a portion of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The computer according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. An inspection apparatus,
the inspection apparatus estimating, based on an action force and a reaction force, a value of a variable included in a function of a relationship between the action force and the reaction force, the action force being applied to an object including a plurality of rigid bodies, the reaction force being from the object when the action force is applied, the variable indicating a state of the object,
the inspection apparatus determining the object to be in a first state when a distance between the rigid bodies estimated using the value is less than a third threshold, and determining the object to be in a second state when the distance is not less than the third threshold, the second state being different from the first state.

2. The inspection apparatus according to claim 1, wherein the object includes a plurality of rigid bodies, and
a distance between the rigid bodies in the second state is longer than a distance between the rigid bodies in the first state.

3. An inspection system, comprising:
the inspection apparatus according to claim 1; and
a striking inspection device including
a striker striking the object,
an actuator driving the striker, and
a strike controller controlling the actuator.

4. The system according to claim 3, wherein the controller calculates a reaction force from the object based on a state of the actuator when the striker strikes the object.

5. The system according to claim 3, wherein
the striker includes a tip contacting the object, and
the tip is spherical or conic.

6. The system according to claim 3, wherein the strike controller separates the striker not less than a reference distance from the object after the striker strikes the object.

7. The system according to claim 3, further comprising:
a moving body carrying the striking device; and
a moving body controller controlling the moving body,
the moving body controller moving the moving body to a position where the object to be struck is provided,
the strike controller striking the object with the striker by operating the actuator after the moving body has moved to the position where the object is provided.

8. The system according to claim 3, wherein
the object includes:
a plurality of coils provided inside a slot of an iron core;
a wedge pressing the plurality of coils; and
a plurality of spacers is provided respectively between a bottom surface of the slot and one of the plurality of coils, between the coils, and between the wedge and an other one of the plurality of coils; and
the striker strikes the wedge.

9. An inspection apparatus,
the inspection apparatus performing a first determination operation of comparing, to a first threshold, an intensity at a first frequency of a frequency characteristic, the frequency characteristic being generated based on a vibration of an object when a strike is applied to the object,
the inspection apparatus performing a second determination operation of estimating, based on an action force and a reaction force, a value of a variable included in a function of a relationship between the action force and the reaction force and comparing, to a third threshold, a distance between a plurality of rigid bodies estimated using the value, the action force being applied to an object including the plurality of rigid bodies, the reaction force being from the object when the action force is applied, the variable indicating a state of the object,
the inspection apparatus determining the object to be in a first state when the intensity in the first determination operation is not less than the first threshold and the distance in the second determination operation is less than the third threshold, and determining the object to be in a second state when the intensity in the first determination operation is less than the first threshold or the distance in the second determination operation is not less than the third threshold, the second state being different from the first state.

10. An inspection system, comprising:
the inspection apparatus according to claim 9; and
a striking inspection device including
a striker striking the object,
an actuator driving the striker, and
a strike controller controlling the actuator.

11. The system according to claim 10, wherein the controller calculates a reaction force from the object based on a state of the actuator when the striker strikes the object.

12. The system according to claim 10, wherein
the striker includes a tip contacting the object, and
the tip is spherical or conic.

13. The system according to claim 10, q therein the strike controller separates the striker not less than a reference distance from the object after the striker strikes the object.

14. The system according to claim 10, further comprising:
a moving body carrying the striking device; and
a moving body controller controlling the moving body,
the moving body controller moving the moving body to a position where the object to be struck is provided,
the strike controller striking the object with the striker by operating the actuator after the moving body has moved to the position where the object is provided.

15. The system according to claim 10, wherein
the object includes:
a plurality of coils provided inside a slot of an iron core;
a wedge pressing the plurality of coils; and
a plurality of spacers is provided respectively between a bottom surface of the slot and one of the plurality of coils, between e coils, and between the wedge and an other one of the plurality of coils; and the striker strikes the wedge.

16. An inspection method, comprising:

estimating, based on an action force and a reaction force, a value of a variable included in a function of a relationship between the action force and the reaction force, the action force being applied to an object including a plurality of rigid bodies, the reaction force being from the object when the action force is applied, the variable indicating a state of the object, determining the object to be in a first state when a distance between the rigid bodies estimated using the value is less than a third threshold, and determining the object to be in a second state when the distance is not less than the third threshold, the second state being different from the first state.

17. A non-transitory computer-readable storage medium storing a program causing a processing device to execute the method according to claim 16.

18. An inspection method, comprising:

performing a first determination of comparing, to a first threshold, an intensity at a first frequency of a frequency characteristic generated based on a vibration of an object when a strike is applied to the object;

performing a second determination of estimating, based on an action force and a reaction force, a value of a variable included in a function of a relationship between the action force and the reaction force; and comparing, to a third threshold, a distance between a plurality of rigid bodies estimated using the value, the action force being applied to an object including the plurality of rigid bodies, the reaction force being from the object when the action force is applied, the variable indicating a state of the object; and determining the object to be in a first state when the intensity of the first determination is not less than the first threshold and the distance of the second determination is less than the third threshold, and determining the object to be in a second state when the intensity of the first determination is less than the first threshold or the distance of the second determination is not less than the third threshold, the second state being different from the first state.

19. A non-transitory computer-readable storage medium storing a program causing a processing device to execute the method according to claim 18.

* * * * *